US008414939B2

(12) United States Patent
Shen et al.

(10) Patent No.: US 8,414,939 B2
(45) Date of Patent: Apr. 9, 2013

(54) FOOD PRODUCT WITH AN ENCAPSULATED LECITHIN MATERIAL

(75) Inventors: Chungsea A. Shen, Deerfield, IL (US); Armando J. Castro, Westchester, IL (US); Michael Catizone, Plainfield, IL (US); Bruno Padovani, Naperville, IL (US); David G. Barkalow, Deerfield, IL (US); Xiaohu Xia, Evanston, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 12/376,081

(22) PCT Filed: Jul. 25, 2007

(86) PCT No.: PCT/US2007/016834

§ 371 (c)(1),
(2), (4) Date: Feb. 2, 2009

(87) PCT Pub. No.: WO2008/016540

PCT Pub. Date: Feb. 7, 2008

(65) Prior Publication Data

US 2009/0258108 A1 Oct. 15, 2009

Related U.S. Application Data

(60) Provisional application No. 60/834,646, filed on Jul. 31, 2006.

(51) Int. Cl.
*A23G 4/18* (2006.01)

(52) U.S. Cl. .......................................................... 426/5

(58) Field of Classification Search ....................... 426/5
See application file for complete search history.

(56) References Cited

U.S. PATENT DOCUMENTS 4,828,845 A * 5/1989 Zamudio-Tena et al. ......... 426/5
4,844,926 A 7/1989 Hatanaka
5,126,151 A 6/1992 Bodor et al.
5,128,155 A 7/1992 Song et al.
5,145,708 A * 9/1992 Patel et al. .................... 426/662
5,217,735 A 6/1993 Zibell
5,366,740 A 11/1994 Shaw et al.
5,424,081 A 6/1995 Owusu-Ansah et al.
5,482,722 A 1/1996 Cook
5,552,163 A 9/1996 Hartman et al.
5,580,590 A 12/1996 Hartman
5,601,858 A 2/1997 Mansukhani et al.
5,672,367 A 9/1997 Grijpma et al.
6,159,447 A 12/2000 Budny et al.
6,190,705 B1 2/2001 Richey
6,441,126 B1 8/2002 Cook et al.
6,627,233 B1 9/2003 Wolf et al.
6,733,578 B2 5/2004 Liu et al.
6,773,730 B1 8/2004 Liu et al.
6,949,264 B1 9/2005 McGrew et al.
6,986,907 B2 1/2006 Phillips et al.
7,022,352 B2 4/2006 Castro et al.
7,070,818 B1 7/2006 Nielsen et al.
2004/0022895 A1 2/2004 Castro et al.
2004/0146599 A1 7/2004 Andersen et al.
2004/0156949 A1 8/2004 Andersen et al.
2004/0166197 A1 8/2004 Ribadeau-Dumas et al.
2005/0025858 A1 2/2005 Phillips et al.
2006/0141094 A1 6/2006 Sato et al.
2006/0177383 A1 8/2006 Gebreselassie et al.
2006/0263474 A1 11/2006 Luo
2006/0263480 A1 11/2006 Boghani et al.
2007/0104866 A1 5/2007 McClements et al.

FOREIGN PATENT DOCUMENTS

EP 0 252 374 A1 1/1988
EP 1 440 621 A1 7/2004
WO WO 92/19680 A1 11/1992
WO WO 98/17124 A1 4/1998
WO WO 98/58550 A1 12/1998
WO WO 99/39588 A1 8/1999
WO WO 01/47368 A1 7/2001
WO WO 01/52662 A2 7/2001
WO WO 02/076227 A1 10/2002
WO WO 03/015528 A1 2/2003
WO WO 03/088757 A1 10/2003
WO WO 2004/034804 A1 4/2004
WO WO 2005/063037 A1 7/2005
WO WO 2006/016179 A1 2/2006
WO WO 2007/143989 A1 12/2007
WO WO 2008/016540 A1 2/2008

OTHER PUBLICATIONS

Risch, Sara J. "Chapter 1—Encapsulation: Overview of Uses and Techniques" in "In Encapsulation and Controlled Release of Food Ingredients", ACS Symposium Series. Published by American Chemical Society. 1995. pp. 2-7.*

"Ingredient Breakdown (composition) EMULGUM—EMULPUR IP," Cargill Texturizing Solutions, 2 pages, Apr. 28, 2006.

Fereidoon Shahidi, ed. Bailey's Industrial Oil and Fat Products. 2005. Published by John Wiley and Sons, INC. vol. 3, pp. 400-406.

Food Chemistry (3d Ed.), edited by Owen R. Fennema, Marcel Dekker, Inc., New York, New York, cover page, publication page, p. 231 (1996).

"De-Oiled Lecithin," Thar Technologies, 1 page (date unknown but presumed to be prior to Jul. 31, 2006).

* cited by examiner

*Primary Examiner* — D. Lawrence Tarazano
*Assistant Examiner* — Jenna A Watts
(74) *Attorney, Agent, or Firm* — Steven P. Shurtz; Brinks Hofer Gilson & Lione

(57) ABSTRACT

A composition includes a first component containing phospholipids and a second component encapsulating the first component. The composition includes between about 10% and about 80% by weight phospholipids. The composition may be used in chewing gum to provide a gum cud that does not adhere to concrete and does not dissolve in the mouth while chewing.

24 Claims, No Drawings

FOOD PRODUCT WITH AN ENCAPSULATED LECITHIN MATERIAL

REFERENCE TO EARLIER FILED APPLICATIONS

The present application is a nationalization of PCT Application Serial No. PCT/US2007/016834, filed Jul. 25, 2007, designating the United States, which in turns claims the benefit of the filing date under 35 U.S.C. §119(e) of Provisional U.S. Patent Application Ser. No. 60/834,646, filed Jul. 31, 2006.

BACKGROUND

The present invention relates to a method of incorporating an encapsulated additive, particularly a lecithin material, into a food product. In particular, it relates to a method of incorporating an encapsulated lecithin material into a chewing gum product.

Chewing gum is a widely enjoyed confection product. However, chewing gum has the undesirable quality of sticking to substrates like sidewalks after its use. Therefore, attempts have been made to formulate chewing gum compositions that break down after being used by a consumer. One approach has been to add a relatively large amount (around 5%) de-oiled lecithin to the chewing gum. Chewing gum with de-oiled lecithin results in gum cud that disintegrates and is less adhesive to a concrete substrate. However, it has been found that such high levels of lecithin also cause the chewing gum product itself to eventually dissolve, even during storage and before chewing by a consumer. Thus, it would be desirable to create a chewing gum product that is removable from a substrate and also has a reasonable shelf life.

BRIEF SUMMARY

It has been found that by incorporating an encapsulated lecithin material into a food product such as chewing gum, the food product can maintain a stable shelf life and also be easily removed after use from surfaces such as concrete.

In one aspect, a composition includes a first component containing phospholipids and a second component encapsulating the first component. The composition includes between about 10% and about 80% by weight phospholipids.

In another aspect, a food product includes an encapsulated lecithin material. The encapsulated lecithin material includes a first component including a lecithin material and a second component encapsulating the first component.

In another aspect, a method of preparing an encapsulated lecithin product includes providing a first component and a second component. The first component includes a lecithin material. The first component is encapsulated with the second component to provide the encapsulated lecithin product. The encapsulated lecithin product includes between about 1% and about 10% lecithin material.

The foregoing and other features and advantages of the present invention will become apparent from the following detailed description of the presently preferred embodiments, when read in conjunction with the accompanying examples.

DETAILED DESCRIPTION OF THE PREFERRED EMBODIMENTS

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In one embodiment, the present invention provides an encapsulated lecithin material. The encapsulated material may be added to a food product, such as candy or chewing gum. As used herein, the term "lecithin material" includes both lecithin and de-oiled lecithin. Lecithin is a mixture of phospholipids in oil. De-oiled lecithin is a lecithin material from which most of the oil has been removed. De-oiled lecithin includes primarily phospholipids, but also some glycolipids, carbohydrates, and a small amount of triglycerides. For example, a typical de-oiled lecithin material may include 70-80% phospholipids, 10-15% glycolipids, 5-10% carbohydrates, and about 2% triglycerides. De-oiled lecitihin is available from Cargill, with products including EMULGUM and EMULPUR IP. By encapsulation is meant that the lecithin material is coated with, or otherwise forms a matrix with, another material to provide a barrier around at least a portion of the lecithin material.

The material encapsulating the lecithin material may be any suitable material. The encapsulating material may be selected from corn syrup solids, gum acacia, hydrocolloids (including natural gums such as agar, alginates, guar gum, gum Arabic, locust bean gum, gellan gum, cellulose derivatives, and gelatin), polysaccharides (such as maltodextrin, corn syrup solids, modified and gelatinized starches), and proteins (including gelatin and zein). The encapsulating material may also include a processing aid such as a sugar (such as sucrose, fructose, glucose, galactose, maltose, lactose, and mixtures thereof) or a polyol (such as sorbitol, maltitol, xylitol, erythiritol, lactitol, isomalt, and mixture thereof). The encapsulating material may be water soluble.

Phospholipids may also be encapsulated. The phospholipids may be provided in a lecithin material such as de-oiled lecithin. A component including phospholipids is encapsulated with a material to form an encapsulated phospholipid product. The encapsulated phospholipid product may be between about 10% and about 80% phospholipids by weight. Alternatively, the encapsulated phospholipid product may be between about 15% and about 65% phospholipids by weight. The encapsulating material may be any suitable material, including those previously mentioned for encapsulating a lecithin material. The encapsulated phospholipid product may be added to a food product. The phospholipid or lecithin material may be encapsulated by any suitable method.

It has been found that spray drying is a suitable method for encapsulating the lecithin or other phospholipid material. In spray drying, the material is prepared by spraying a composition including a phospholipid or lecithin material and a carrier such as corn syrup solids, gum acacia, hydrocolloids, polysaccharides, proteins, or mixtures thereof. In one embodiment, the encapsulated material may be prepared by the spray drying technique disclosed in U.S. Published Application 2004/0022895, the contents of which are hereby incorporated by reference herein. The water content of the spray dried material should be about 1% to 5% and preferably 1% to 3%. Due to its water soluble nature, after the gum is chewed in the mouth of a user, the carrier dissolves into saliva.

A second material may be added to the carrier material to aid in the spray drying or other encapsulation technique. The second material may be a sugar (such as sucrose, fructose, glucose, galactose, maltose, lactose, and mixtures thereof) or a polyol (such as sorbitol, maltitol, xylitol, erythritol, lactitol, and isomalt), or mixtures thereof. Sorbitol may be particularly effective because it is less hygroscopic than some of the other materials.

Other food emusifiers besides lecithin may also be spray dried and used in chewing gum to give improved texture properties. These emulsifiers include mono- and diglycerides, distilled monoglycerides, acetylated monoglycerides, diacetyl tartaric acid ester of mono- and diglycerides, polyglycerol esters, sodium and calcium salts of stearoyl lactylates, sorbitan esters, polysorbates, propylene glycol monoesters, and succinylated monoglycerides.

The encapsulated lecithin material may include between about 20% and about 80% lecithin material by weight, between about 20% and about 70% of the carrier material by weight, and between about 2% and about 30% of the second material by weight. In another embodiment, the encapsulated lecithin material may include between about 30% and about 70% lecithin material by weight, between about 20% and about 50% of the carrier material by weight, and between about 5% and about 20% of the second material by weight.

In one method of spray drying, a mixture of 40% to 60% deoiled lecithin, 20% to 50% gum acacia, and 2-20% sorbitol is blended to a solids level of about 20% to 30% in water and heated to about 90-100° F. for spray drying. Spray drying is done using an atomizing spraying nozzle and an inlet temperature above 330° F. In one embodiment, the resulting encapsulated lecithin material was 59% de-oiled lecithin, 29% gum acacia, and 12% sorbitol, and a moisture content of 1.6%.

The phospholipid or lecithin material may also be encapsulated by fluid bed coating. In fluid bed coating, particles of the lecithin material or other phospholipid are suspended in a stream of air. A liquid containing the encapsulating or coating material is sprayed into the fluidized particles, coating the particles. Coating levels may range from 5% to 80% (by weight), depending on the substrate's particle size and the degree of coating desired. A bottom spray or Wurster coater is preferably used. This type of coater is known in the art. The Wurster coater includes a generally cylindrical coating chamber surrounding a separate cylinder in the core, known as a partition. A nozzle is partitioned in the core of a plate under the partition to spray a liquid upwardly through the partition. Air flow is directed through the partition, transporting the substrate past the nozzle which sprays concurrently into the fluidized material.

Food products used with the encapsulated lecithin or other phospholipid may include any sort of product a user would put in the mouth, including confections such as candy and chewing gum. The mixture may also be used in other types of candy products. It is particularly useful in chewing gums (including pellet gum) and chewy confectionery products. Examples of chewy confections include jellies, gummies, caramels, nougats, and taffies.

The encapsulated lecithin material, or encapsulated phospholipids, is mixed with a food product base (such as gum base) to form a food product. In one embodiment, the food product is chewing gum. Where encapsulated lecithin replaces conventional lecithin materials in chewing gum, the level of lecithin in the chewing gum is about 0.1% to about 1%. In special formulations such as non-stick gum products, higher levels of lecithin may be used, and encapsulated lecithins may be preferred. The encapsulated lecithin material may provide between about 1% to about 12%, and preferably about 4% to about 8%, lecithin material in the chewing gum composition.

The encapsulated lecithin material is particularly useful for adding to a chewing gum material. Lecithin has previously been added to many food products, and has been added to chewing gum products as a softener. De-oiled lecithin has also been added (in larger amounts) to chewing gums to provide a product that would be easy to remove from a substrate after used by a consumer. However, it has been found that the de-oiled lecithin interacts in an undesirable way with the gum base during gum storage. This interaction later causes dissolution of the chewing gum cud when the gum is chewed. It is believed that the interaction may be the lecithin molecules diffusing into the rubber network driven by the affinity of lecithin and base ingredient (rubber, fats, and oil) to reach thermodynamic equilibrium. When water, such as saliva, is introduced into this lecithin-diffused rubber network, the rubber network is emulsified, and readily falls apart, results in dissolution of the chewing gum.

It has been found that by encapsulating the lecithin material with another material, the lecithin material can be protected from interacting with the gum base during storage, while providing a product that would be easy to remove from a substrate after used by a consumer. When chewed in the mouth of a user, the encapsulating component dissolves, thus freeing the lecithin material. The resulting gum cud can easily be removed after use from surfaces such as concrete.

Additional materials may be included and encapsulated with the lecithin or other phospholipid material. These materials include sweeteners. However, the encapsulated material in the chewing gum or other food product may also be free from any significant amount of sweetener.

High-intensity sweeteners which may be used in chewing gum or other food product include, but are not limited to, sucralose, aspartame, N-substituted aspartame derivatives such as neotame, acesulfame acid or its salts, alitame, saccharin and its salts, cyclamic acid and its salts, glycyrrhizinate, dihydrochalcones, thaumatin, monellin, monatin; and aminoacid-, dipeptide-, peptide-, and protein-based sweeteners, and the like, alone or in combination. The sweetener may encapsulated with the lecithin material and/or added directly with the other gum components.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastoiners may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. The insoluble gum base may constitute between about 5% and about 95% by weight of the gum. More preferably the insoluble gum base comprises between about 10% and about 50% by weight of the gum, and most preferably between about 20% and about 35% by weight of the gum.

The gum base typically also includes a filler component. The filler component may be calcium carbonate, magnesium carbonate, talc, dicalcium phosphate or the like. The filler may constitute between about 5% and about 60% by weight of the gum base. Preferably, the filler comprises about 5% to about 50% by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5% and about 15% by weight of the chewing gum. Softeners include glycerin, lecithin and combinations thereof. Further, aqueous sweetener solutions such as those containing sorbitol, hydrogenated starch hydrolyzates, corn syrup and combinations thereof may be used as softeners and binding agents in gum.

The chewing gum or other food product may also include one or more flavoring agents. The term "flavoring agent" is meant to include flavors, cooling agents, sensates, and the like. The flavoring agents may comprise essential oils, synthetic flavors, or mixtures thereof including, but not limited to oils derived from plants and fruits such as citrus oils, fruit essences, peppermint oil, spearmint oil, clove oil, oil of wintergreen, anise, and the like. Artificial flavoring components are also contemplated for use in the food products of the present invention. Dry flavors such as menthol or dried flavor blends of oils or fruit essences are contemplated for the present invention. Liquid flavors may be blended with the sweetener. Those skilled in the art will recognize that natural and artificial flavoring agents may be combined in any sensorally acceptable blend. All such flavors and flavor blends are contemplated by the present invention.

Physiological cooling agents may also be used. A variety of physiological cooling agents are discussed in U.S. Pat. No. 6,627,233, the contents of which are hereby incorporated by reference herein. Physiological cooling agents include substituted p-menthane carboxamides (such as WS-3); acyclic carboxamides (such as WS-23); menthone glycerol ketal; menthyl lactate; menthyl succinate; and 3-1-menthoxypropane-1,2-diol.

Sensates may also be used as flavoring agents and include cooling agents, and pungent, hot, and tingling flavors.

Optional ingredients such as colors, emulsifiers and pharmaceutical agents may be added to the chewing gum or other food product.

The chewing gum product may include other sweeteners in addition to those provided, if any, in the encapsulated material. Sugarless sweeteners include components with sweetening characteristics but which are devoid of the commonly known sugars and comprise, but are not limited to, sugar alcohols such as sorbitol, mannitol, xylitol, erythritol, isomalt, hydrogenated starch hydrolyzates, maltitol and the like, alone or in any combination.

Sugar bulk sweeteners include, but are not limited to, sucrose, dextrose, maltose, dextrin, dried invert sugar, fructose, levulose, galactose, corn syrup solids, and the like, alone or in combination.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets. A pellet center may be coated with a hard shell coating that may also contain flavoring agents to give a fast release of flavor initially.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further portions of the bulking agent may then be added to the mixer. A flavoring agent is typically added with the final portion of the bulking agent. The encapsulated lecithin material is preferably added with the final portion of the bulking agent and before the flavor is added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

Chewing gum samples were prepared by a process using various compositions according to the present invention, as well as comparative examples. The chewing gum samples were tested for mouth dissolvability as well as removability from a substrate.

Chewing gum compositions were prepared using the formulations in Tables 1-3.

TABLE 1

Comparative Formulations

| Ingredient | Comparative Example A | Comparative Example B | Comparative Example C |
|---|---|---|---|
| Surose | 60.93 | 62.35 | 62.35 |
| Gum base | 19.95[(a)] | 16[(b)] | 16[(a)] |
| Corn Syrup (19.95% water) | | 15 | 15 |
| Corn Syrup (14.9% water) | 16.6 | | |
| De-oiled lecithin | | 5 | 5 |
| Peppermint flavor | 0.9 | 0.9 | 0.9 |
| Menthol | | 0.15 | 0.15 |
| Color | | 0.6 | 0.6 |
| Glycerin | 1.4 | | |
| Water | 0.22 | | |

[(a)]palm oil base
[(b)]soy oil base

TABLE 2

Formulations of Examples 1-5

| Ingredient | Example 1 | Example 2 | Example 3 | Example 4 | Example 5 |
|---|---|---|---|---|---|
| Surose | 48.35 | 56.35 | 61.15 | 55.15 | 60.65 |
| Base | 16[(a)] | 16[(a)] | 16[(b)] | 16[(a)] | 16[(a)] |
| Corn Syrup (19.95% water) | 15 | 15 | 15 | 15 | 15 |
| Encapsulated de-oiled lecithin | 15 | 10 | 5 | 11 | 5.5 |
| Peppermint flavor | 0.9 | 0.9 | 0.9 | 0.9 | 0.9 |
| Menthol | 0.15 | 0.15 | 0.15 | 0.15 | 0.15 |
| Color | 0.6 | 0.6 | 0.6 | 0.6 | 0.6 |
| Glycerin | 2.0 | | | | |
| Water | 2 | 1 | 1.2 | 1.2 | 1.2 |

[(a)]palm oil base
[(b)]soy oil base

TABLE 3

| Formulations of Examples 6-11 | | | | | | |
|---|---|---|---|---|---|---|
| Ingredient | Example 6 | Example 7 | Example 8 | Example 9 | Example 10 | Example 11 |
| Surose | 57.65 | 57.65 | 61.9 | 57.65 | 52.43 | 55.15 |
| Base | 16[(b)] | 16[(b)] | 16[(b)] | 16[(a)] | 19.95[(a)] | 16[(a)] |
| Corn Syrup (19.95% water) | 15 | 15 | 15 | 15 | 16.83 | 15 |
| Encapsulated de-oiled lecithin | 8.5 | 8.5 | 4.25 | 8.5 | 8.5 | 11 |
| Peppermint flavor | 0.9 | 0.9 | 0.9 | 0.9 | 0.9 | 0.9 |
| Menthol | 0.15 | 0.15 | 0.15 | 0.15 | | 0.15 |
| Color | 0.6 | 0.6 | 0.6 | 0.6 | 0.6 | 0.6 |
| Glycerin | | | | | | |
| Water | 1.2 | 1.2 | 1.2 | 1.2 | | 1.2 |

[(a)]palm oil base
[(b)]soy oil base

Comparative Example A contained no lecithin. Comparative Examples B and C contained de-oiled lecithin (unencapsulated) at 5%. Examples 1-11 contained defiled lecithin encapsulated with gum acacia (and in some cases, additionally sorbitol), as shown in Table 4 below. For Examples 1-11, the encapsulated de-oiled lecithin was prepared by spray drying lecithin, gum acacia, and optionally sorbitol in the stated ratios. For example, lecithin:acacia:sorbitol at a 10:10:2 ratio means that the spray drying formulation contained 10 parts by weight lecithin, 10 parts by weight gum acacia, and 2 parts by weight sorbitol. The encapsulated de-oiled lecithin was then added to the other components of the chewing gum composition.

TABLE 4

| Lecithin Content of Examples | |
|---|---|
| Example | Lecithin Content |
| Comparative Example A | None |
| Comparative Example B | De-oiled lecithin at 5% |
| Comparative Example C | De-oiled lecithin at 5% |
| Example 1 | Spray-dried de-oiled lecithin:*acacia* at a 1:2 ratio at 15%. |
| Example 2 | Spray-dried de-oiled lecithin:*acacia* at a 1:1 ratio at 10%. |
| Example 3 | Spray-dried de-oiled lecithin:*acacia* at a 1:1 ratio at 5%. |
| Example 4 | Spray-dried de-oiled lecithin:*acacia*:sorbitol at 10:10:2 ratio 11%. |
| Example 5 | Spray-dried de-oiled lecithin:*acacia*:sorbitol at a 10:10:2 ratio at 5.5%. |
| Example 6 | Spray-dried de-oiled lecithin:*acacia*:sorbitol at a 10:5:2 ratio at 8.5%. |
| Example 7 | Spray-dried de-oiled lecithin:*acacia*:sugar at a 10:5:2 ratio at 8.5%. |
| Example 8 | Spray-dried de-oiled lecithin:*acacia*:sugar at a 10:5:2 ratio at 4.25%. |
| Example 9 | Spray-dried de-oiled lecithin:*acacia*:sugar at a 10:5:2 ratio at 8.5% |
| Example 10 | Spray-dried de-oiled lecithin:*acacia*:sugar at a 10:5:2 ratio at 8.5%. |
| Example 11 | Spray-dried de-oiled lecithin:*acacia*:sorbitol at a 10:10:2 ratio at 5.5%. |

Dissolvability Test

After the chewing gum samples were prepared, they underwent accelerated aging at conditions of 45° C. and 85% relative humidity. Samples were tested after conditioning for 1 week, 2 weeks, and/or 3 weeks. The chewing of chewing gum by a consumer was simulated using a gum dissolution by lipase test. This test is conducted as follows. A gum sample is placed in a brabender mixer with frequent addition of lipase solution, simulating the mouth chewing action. The lipase time is recorded as the time elapsed before the test sample falls apart in the brabender mixer. A four hour lipase time is considered as passing, since a sample lasting that long would have little chance of dissolving in a consumer's mouth. A longer lipase time indicates better resistance to gum dissolution.

Dissolvability tests were carried out using the chewing gums of Comparative Examples B and C and Examples 1, 4, 6-9, and 11. Table 5 shows the lipase time, which is the time elapsed before the test sample falls apart in the brabender mixer. The longer lipase time for the Examples 1, 4, 6-9, and 11 compared to Comparative Examples B and C indicates that the encapsulated de-oiled lecithin prevents the lecithin from dissolving the gum base when the gum is chewed by a consumer.

TABLE 5

| Lipase Test | | | |
|---|---|---|---|
| Example | 1 week | 2 weeks | 3 weeks |
| Comparative Example B | 2:15 | 1:30 | 1:03 |
| Comparative Example C | 1:32 | 0:57 | |
| Example 1 | PASS | | |
| Example 4 | PASS | PASS | 3:40 |
| Example 6 | PASS | 3:29 | 3:49 |
| Example 7 | PASS | 3:17 | 2:40 |
| Example 8 | PASS | PASS | 3:25 |
| Example 9 | PASS | 3:04 | |
| Example 11 | PASS | PASS | 3:08 |

Removability Tests

After the dissolvability test, the removability of the chewing gum samples was tested for Comparative Example A (containing no lecithin), Comparative Example C (containing unencapsulated lecithin), and Example 11 (containing encapsulated lecithin) using two standard gum removability tests. The samples were prepared as follows. One stick of gum or two pellets of gum were chewed for 12 minutes and then placed in water at about 55-70° F. for several minutes. The gum cud was then placed on a concrete surface such as a concrete paver. The pavers were kept at room temperature for 24 hours before gum application. A release paper (2"×2") was placed on top of the gum cud. Then two additional pavers were placed on top and the gum was sandwiched in between two pavers. Pavers with gum cuds were placed in oven at 90° F. for 24 hours. After the gum reached room temperature, the top two pavers and then the release paper were removed. Gum cuds were allowed to age for 3 days. Gum cud was placed on a concrete substrate, and aged for 3 days before testing.

In the mechanical sweeper test, a mechanical sweeper (Tennant 5700 XP) was used. One dry pass and four wet passes with the mechanical sweeper were made over the gum. After the wet passes, the gum was visually assessed to determine the amount of gum cud removed. In the simulated rain test, the condition of the gum cud was assessed after putting the sample under running water for 24 hours. The evaluation of gum removability relies on a visual assessment in comparison to a reference sample: 0% indicates "no removal," and 100% indicates "total removal." The results of these tests are shown in Table 6 below.

As shown below in Table 6, it can be seen that Example 11, which contained encapsulated de-oiled lecithin, had good removability. Comparative Example C, with unencapsulated lecithin, also had good removability. Comparative Example A, which contained no de-oiled lecithin, was not removed at all by the tests.

TABLE 6

Removability from Substrate

| | Sweeper Test | Simulated "rain" condition test |
|---|---|---|
| Comparative Example A | 0% | 0% |
| Comparative Example C | 57% | 100% |
| Example 11 | 47% | 100% |

Thus, it can be seen that chewing gum products incorporating encapsulated de-oiled lecithin provided acceptable mouth dissolvability as well as removability from a substrate.

It should be appreciated that the methods and compositions of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. An encapsulated phospholipid product comprising:

a) a first component comprising phospholipids;

b) a second component encapsulating the first component; and c) a third component selected from the group consisting of polyols, sugars, and mixtures thereof, included with the second component as a processing aid, wherein the product comprises between about 10% and about 80% by weight phospholipids;

d) wherein the first component has been fluid bed coated with the second component and the third component.

2. The product of claim 1 wherein the first component comprises de-oiled lecithin, and wherein the phospholipids in the first component are provided by the de-oiled lecithin.

3. The product of claim 1 wherein the second component is water soluble.

4. The product of claim 1 wherein the second component comprises an encapsulating material selected from the group consisting of corn syrup solids, gum acacia, hydrocolloids, polysaccharides, proteins, and mixtures thereof.

5. The product of claim 1 wherein the product comprises about 20% to about 70% by weight of the second component and about 2% and about 30% by weight of the third component.

6. A food product comprising:

a) an encapsulated lecithin material comprising:

i) a first component comprising a lecithin material; and ii) a second component encapsulating the first component; wherein the encapsulated lecithin material further comprises a third component selected from the group consisting of polyols, sugars, and mixtures thereof included with the second component as a processing aid; and wherein the encapsulated lecithin material comprises between about 20% and about 80% by weight lecithin material, and the second and third component provide a barrier around at least a portion of the lecithin material by the first component being fluid bed coated with the second component and the third component.

7. The food product of claim 6 wherein the first component comprises de-oiled lecithin.

8. The food product of claim 7 wherein the de-oiled lecithin comprises 70%-80% phospholipids.

9. The food product of claim 6 wherein the second component is water soluble.

10. The food product of claim 6 wherein the second component comprises an encapsulating material selected from the group consisting of corn syrup solids, gum acacia, hydrocolloids, polysaccharides, proteins, and mixtures thereof.

11. The food product of claim 6 wherein the encapsulated lecithin material comprises between about 20% and about 80% by weight de-oiled lecithin, between about 20% and about 70% by weight of the second component, and between about 2% and about 30% by weight of the third component.

12. The food product of claim 7 wherein the food product is chewing gum.

13. The food product of claim 12 wherein the chewing gum comprises between about 1% and about 12% by weight de-oiled lecithin.

14. A method of preparing a food product containing an encapsulated lecithin product comprising:

a) providing a first component comprising a lecithin material;

b) providing a second component;

c) providing a third component selected from the group consisting of polyols, sugars, and mixtures thereof; and d) encapsulating the first component with the second component and the third component using fluid bed coating to provide the encapsulated lecithin product, and incorporating the encapsulated lecithin product into a food product so that the food product comprises between about 1% and about 12% lecithin material by weight.

15. The method of claim 14 wherein the lecithin material further comprises de-oiled lecithin.

16. The method of claim 14 wherein the second component comprises a material selected from the group consisting of corn syrup solids, gum acacia, hydrocolloids, polysaccharides, proteins, and mixtures thereof.

17. The method of claim 15 wherein the encapsulated lecithin material comprises between about 20% and about 80% de-oiled lecithin by weight.

18. A chewing gum product comprising:

a) between about 1% and about 12% by weight of the chewing gum of an encapsulated de-oiled lecithin material comprising:

i) a first component comprising de-oiled lecithin;

ii) a second component selected from the group consisting of corn syrup solids, gum acacia, hydrocolloids, polysaccharides, proteins, and mixtures thereof encapsulating the first component; wherein the first component has been fluid bed coated with the second component; and iii) a third component selected from the group consisting of polyols, sugars, and mixtures thereof included with the second component as a processing aid during the fluid bed coating; the encapsulated lecithin material comprising between about 20% and about 80% by weight de-oiled lecithin, between about 20% and about 70% by weight of the second component, and between about 2% and about 30% by weight of the third component;

b) a chewing gum base;

c) a bulking and sweetening agent; and d) a flavoring agent.

19. The chewing gum product of claim 18 wherein the product, after being stored at 45° C. and 85% relative humidity for one week, does not fall apart when mixed with a lipase solution in a brabender mixer to simulate mouth chewing action for at least four hours.

20. The chewing gum product of claim 18 wherein the product, after being chewed for 12 minutes, then placed in water at about 55-70° F. for several minutes, then placed on a concrete paver kept at room temperature for 24 hours before gum application, with a release paper placed on top of the gum cud and two additional pavers placed on top, with the gum sandwiched in between the two pavers and release paper on top and the first paver on bottom, then placed in an oven at 90° F. for 24 hours, then cooled to room temperature, then the top two pavers and the release paper being removed, and then being allowed to age for 3 days, has an easy removability such that in a simulated rain test, wherein the gum cud is put under running water for 24 hours, substantially all of the cud is removed by the running water.

21. The product of claim 1 wherein the polyols are selected from the group consisting of sorbitol, maltitol, xylitol, erythritol, lactitol, isomalt and mixture thereof.

22. The food product of claim 6 wherein the polyols are selected from the group consisting of sorbitol, maltitol, xylitol, erythritol, lactitol, isomalt and mixture thereof.

23. The method of claim 14 wherein the polyols are selected from the group consisting of sorbitol, maltitol, xylitol, erythritol, lactitol, isomalt and mixture thereof.

24. The chewing gum product of claim 18 wherein the polyols are selected from the group consisting of sorbitol, maltitol, xylitol, erythritol, lactitol, isomalt and mixture thereof.

* * * * *